US008664795B2

(12) United States Patent  
Borden et al.

(10) Patent No.: US 8,664,795 B2
(45) Date of Patent: Mar. 4, 2014

(54) STRUCTURE AND METHOD FOR CAPTURING AND CONVERTING WIND ENERGY AT SEA

(71) Applicants: Robert M. Borden, Banff (CA); Wendell M. Smith, Enfield, NH (US)

(72) Inventors: Robert M. Borden, Banff (CA); Wendell M. Smith, Enfield, NH (US)

(73) Assignee: Polestar, Ltd. (BM)

( * ) Notice: Subject to any disclaimer, the term of this patent is extended or adjusted under 35 U.S.C. 154(b) by 0 days.

(21) Appl. No.: 13/849,308

(22) Filed: Mar. 22, 2013

(65) Prior Publication Data

US 2013/0213289 A1  Aug. 22, 2013

Related U.S. Application Data

(60) Division of application No. 12/175,161, filed on Jul. 17, 2008, now Pat. No. 8,405,242, which is a division of application No. 11/008,534, filed on Dec. 9, 2004, now Pat. No. 7,453,164, which is a continuation-in-part of application No. 10/869,476, filed on Jun. 16, 2004, now abandoned.

(60) Provisional application No. 60/478,873, filed on Jun. 16, 2003.

(51) Int. Cl.
*F03D 9/00* (2006.01)
*H02P 9/04* (2006.01)

(52) U.S. Cl.
USPC ............................................. 290/55; 290/44

(58) Field of Classification Search
USPC ........................................................ 290/44, 55
See application file for complete search history.

(56) References Cited

U.S. PATENT DOCUMENTS

| 863,532 | A | | 8/1907 | Hector | 114/331 |
|---|---|---|---|---|---|
| 1,691,738 | A | | 11/1928 | Powell | 114/53 |
| 2,280,547 | A | | 4/1942 | Scofield | 114/52 |
| 2,363,488 | A | | 11/1944 | Bartlett | 114/50 |
| 3,541,986 | A | | 11/1970 | Kriedt et al. | 114/52 |
| 3,782,317 | A | | 1/1974 | Kriedt et al. | 114/52 |
| 3,870,605 | A | * | 3/1975 | Sakamoto | 202/234 |
| 4,123,991 | A | | 11/1978 | Kinrade | 119/409 |
| 4,159,427 | A | * | 6/1979 | Wiedemann | 290/55 |
| 4,233,127 | A | | 11/1980 | Monahan | 204/157.5 |
| 4,276,846 | A | | 7/1981 | Anderson | 114/52 |
| 4,335,093 | A | | 6/1982 | Salomon | 423/644 |
| 4,338,874 | A | | 7/1982 | Shaw et al. | 114/50 |
| 4,569,303 | A | | 2/1986 | McDuff et al. | 114/227 |
| 5,128,042 | A | | 7/1992 | Fenton | 210/642 |

(Continued)

FOREIGN PATENT DOCUMENTS

GB  2383978 A  7/2003
WO  03076800 A2  9/2003

*Primary Examiner* — Pedro J Cuevas
(74) *Attorney, Agent, or Firm* — St. Onge Steward Johnston Reens LLC

(57) ABSTRACT

A system for capturing and converting and/or storing wind energy includes a vessel adapted to receive at least one wind machine for capturing wind and a device for converting wind energy to storable energy. A method of adapting a vessel, such as a surplus cargo ship or an oil tanker, for use as a offshore power generating system comprises equipping a vessel with devices for capturing a renewable energy source, positioning the vessel at sea to capture the renewable energy source, converting the renewable energy to a storable energy source, and storing the converted energy, and repositioning the vessel to capture further renewable energy or transport the stored, converted energy.

18 Claims, 3 Drawing Sheets

(56) References Cited

U.S. PATENT DOCUMENTS

| | | | |
|---|---|---|---|
| 5,156,927 A | 10/1992 | Nakamats | 429/422 |
| 5,512,787 A | 4/1996 | Dederick | 290/4 R |
| 5,516,235 A | 5/1996 | Stangroom | 405/188 |
| 5,564,955 A | 10/1996 | Ingraham | 440/6 |
| 5,950,732 A * | 9/1999 | Agee et al. | 166/354 |
| 5,964,089 A | 10/1999 | Murphy et al. | 60/286 |
| 6,100,600 A | 8/2000 | Pflanz | 290/54 |
| 6,294,844 B1 | 9/2001 | Lagerwey | 290/55 |
| 6,531,788 B2 | 3/2003 | Robson | 290/43 |
| 6,817,320 B2 | 11/2004 | Balan et al. | 123/3 |
| 7,075,189 B2 | 7/2006 | Heronemus et al. | 290/44 |
| 7,246,492 B2 * | 7/2007 | Hendrix et al. | 60/641.8 |
| 7,453,164 B2 | 11/2008 | Borden et al. | 290/42 |
| 7,544,108 B2 * | 6/2009 | Rzadki et al. | 440/6 |
| 7,994,649 B2 | 8/2011 | Abatemarco | 290/43 |
| 8,169,099 B2 | 5/2012 | Roznitsky et al. | 290/44 |
| 2001/0002757 A1 | 6/2001 | Honda et al. | 290/55 |
| 2002/0182946 A1 | 12/2002 | Tanaka | 440/6 |
| 2003/0168864 A1 | 9/2003 | Heronemus et al. | 290/55 |
| 2004/0182080 A1 * | 9/2004 | Hendrix et al. | 60/641.8 |
| 2006/0119106 A9 | 6/2006 | Borden et al. | 290/44 |
| 2007/0077830 A1 * | 4/2007 | Rzadki et al. | 440/6 |
| 2009/0033656 A1 | 2/2009 | Larkins et al. | 345/419 |
| 2009/0315330 A1 * | 12/2009 | Dederick | 290/53 |
| 2010/0116684 A1 * | 5/2010 | Sawyer | 205/628 |
| 2010/0244450 A1 * | 9/2010 | Tabe | 290/53 |
| 2010/0258449 A1 * | 10/2010 | Fielder | 205/628 |
| 2010/0319248 A1 * | 12/2010 | Reyankar Krishna Prasad | 47/48.5 |
| 2011/0315253 A1 * | 12/2011 | David | 137/565.01 |
| 2012/0104762 A1 | 5/2012 | Wilson, Jr. et al. | 290/55 |
| 2012/0267897 A1 | 10/2012 | Williams | 290/55 |

* cited by examiner

STRUCTURE AND METHOD FOR CAPTURING AND CONVERTING WIND ENERGY AT SEA

FIELD OF THE INVENTION

The present invention relates to a wind-generated power system. More specifically, the present invention relates to a vessel having wind towers or turbines to receive wind and generate electricity which is then converted and stored as hydrogen available for on-board use and transport by the vessel for use elsewhere.

BACKGROUND OF THE INVENTION

Wind is a renewable energy source. Turbines or towers which use the kinetic energy of wind to generate mechanical energy, and convert the mechanical energy to electricity are known. Wind towers or turbines typically have two or three blades which may face into or away from the wind. As the wind causes the blades to rotate, the shaft in the turbine spins. The mechanical energy generated may be used to power certain tasks, like pumping water, or may be converted to electricity. When connected to a generator, the spinning of the shaft drives the generator which produces electricity.

Wind power has the advantage of being a free, renewable energy source. It also has the drawback of providing only intermittent energy. Wind towers take up a large amount of land and have recently been placed offshore. Offshore locations solve noise and sighting problems, but raise other ecological issues with support structure requirements. There remains a need to efficiently harness wind power and easily store it such that it the energy generated can be used whenever needed, with minimal ecological impact.

The open oceans are the greatest source of wind energy. The use of wind turbines on offshore towers, floating barges, and anchored hulls in order to generate electricity are known and disclosed in U.S. Patent Application Pub. No. US 2003/0168864 to Heronemus et al., PCT Application Pub. No. WO 03/076800 to Heronemus. U.S. Pat. No. 5,512,787 to Dederick, U.S. Pat. No. 6,294,844 to Lagerwey, and U.S. Patent Application Pub. No. US 2001/0002757 to Honda et al. These systems are limited in that they are not capable of self-storage of the energy generated and/or transporting such energy themselves by means of self-propulsion.

While some power generating crafts with self-propulsion are known in the art, they fail to achieve on-board storage, utilization and transport of energy in the form of hydrogen, for example as in U.S. Pat. No. 4,159,427 to Wiedemann. U.S. Patent Application Pub. No. US 2002/0182946 A1 to Tanaka discloses a ship power plant which generates wind, in addition to solar and thermal power, to obtain electric energy and preferably store it in a battery. In one embodiment, Tanaka suggests the electric energy may alternatively be converted to hydrogen gas or compressed liquid hydrogen by electrolysis, and then the hydrogen and/or oxygen generated is sent to a land base by a transmitting system connecting sea base to land base. This system lacks the abilities of self-storage and self-transport of the hydrogen energy generated.

There remains a need in the art for a vessel capable of storing and/or utilizing the energy generated by wind and further capable of self-transport of the stored energy, without requiring transmission to a land base for use.

SUMMARY OF THE INVENTION

In one aspect of the present invention, a structure for capturing and converting wind power comprising a vessel with a motor to propel the vessel to a location for capturing the wind, at least one machine disposed on the vessel for receiving and converting wind power to mechanical energy and equipment in the vessel to convert it to hydrogen fuel, is provided.

In another aspect of the present invention, a system for generating hydrogen power comprising a vessel having a motor, at least one device for capturing at least one renewable energy source and converting it to electric energy, and an electrolytic cell that electrolyzes water to convert the electric energy to hydrogen for storage as a power source on the vessel, is provided.

In another aspect of the present invention, method of capturing and converting and/or storing wind energy at sea comprising positioning a vessel adapted to receive at least one wind machine for capturing wind, converting wind energy to storable energy, storing the converted energy, and powering the vessel with the stored, converted energy, is provided.

In another aspect of the present invention, a method of adapting vessel to create an offshore power generating system, comprising the steps of salvaging a vessel retired from its original use, equipping the vessel with at least one device for capturing a renewable energy source and converting it to a storable energy source and a storage device for storing the converted energy source, positioning the vessel at a first location at sea to capture the renewable energy source at the first location, converting the renewable energy to a storable energy source, storing the converted energy, and repositioning the vessel to an at least second location, is provided.

DETAILED DESCRIPTION OF THE INVENTION

Figure 1:
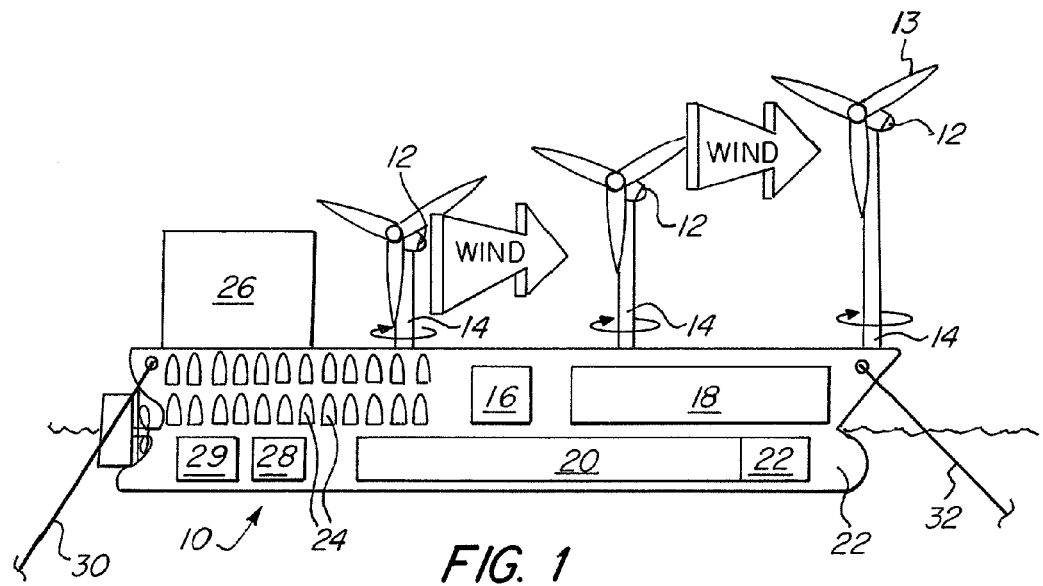
FIG. 1 is schematic view of the system for generating hydrogen power of the present invention.

Hydrogen is becoming a major component of the energy system of the future as the fuel for vehicles such as, cars, trucks and buses, and local electrical generating stations. The system and vessel for generating hydrogen power according to the present invention provides a renewable, "free" source of energy that is consumed without combustion or pollution.

The term vessel as used herein refers to a craft designed to navigate on water. Vessels described herein are preferably large water craft that may be anchored at sea as well capable of navigation through waters and into ports by means of propulsion, such as motors. The term "motor" as used herein refers to a device that uses any form of energy to impart motion. More preferably, vessels described herein are existing surplus cargo ships which may travel by and/or be anchored at sea. As there is a surplus of offshore cargo ships which are no longer used or needed for their purpose as originally built, they may easily be equipped with turbines and other components according to the present invention. These vessels are already equipped with means of propulsion, such as motors or engines to drive propellers, thrusters, and/or water jets typically built to run on traditional fuels, such as bunker fuel, diesel fuel, and in some modern applications, liquefied natural gas (LNG). These existing vessels may be adapted with equipment to allow for propulsion by use of any desired engine or motor using any desired energy source or fuel, including that captured, converted, and stored by the vessel itself, specifically, a renewable energy such a wind power. The term propulsion as used herein refers generally to and includes the positioning, moving, driving, navigation, motorization, and/or directing of the vessel at sea.

The term wind power system as used herein refers to any system or device to convert wind energy into electrical power. Wind machines, such as turbines and towers, disposed on offshore vessels are capable of capturing the most reliable winds at and near the sea level. The term wind machine as used herein refers to any device with a mechanism for converting the movement of air into a mechanical motion which may then be converted by a generator into electrical power. Wind machines include turbines, where the turbine is perpendicular to the wind and mounted on a tower. Turbines may have a horizontal-axis, where the rotor faces the wind and typically two or three blades catch the wind and spin. The blades are connected to a drive shaft that turns an electric generator to produce electricity. Turbines may have a vertical-axis which can accept wind from any direction, such as the Darrieus wind turbine which consists of several aerofoils vertically mounted on a rotating shaft or framework in an eggbeater shape.

Wind machines may include systems that do not use blades, such as the Wind Amplified Rotor Platform (WARP) which has several stacked modules along a tower, each module with a pair of small, high capacity turbines mounted to its concave channel surfaces which channel wind toward the turbines, amplifying wind speeds. The present invention is not limited to use of any type of wind machine and use of any of these terms used throughout the application is not done so to be limiting.

Referring to FIG. 1, vessel is shown generally at 10 including a plurality of wind machines, shown here as turbines 12 of varying heights mounted on the vessel 10. Blades 13 of the turbines 12 capture wind, which turns the shafts 14 of the turbines 12 and which in turn drives a generator 16 to produce electricity.

Figure 3:
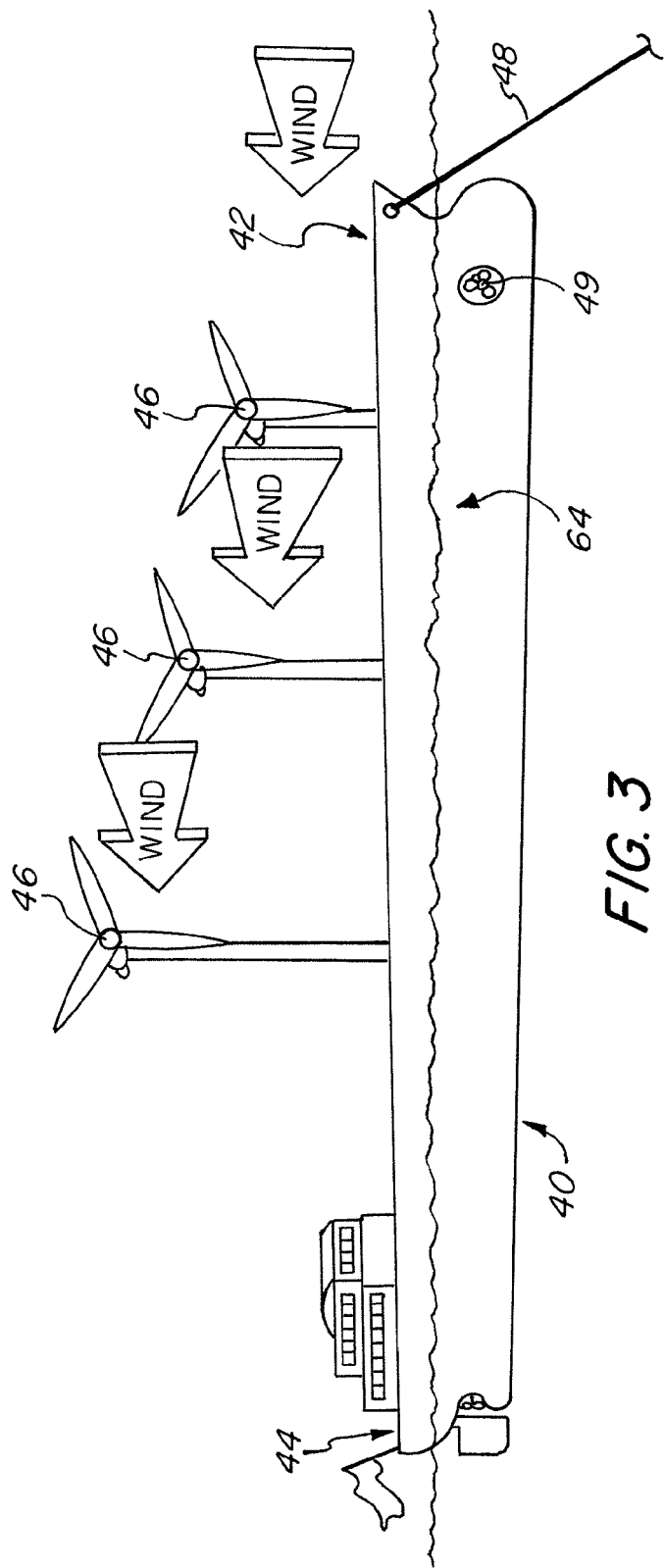
FIG. 3 perspective view of a vessel according to the present invention.

As shown in FIG. 1, vessel 10 may be positioned so that the turbines 12 are situated into the wind with fore and aft anchoring 30, 32 to capture the most wind. In this anchor position, turbines may be of equal heights without interfering with one another in capturing the wind. It is preferable to vary the heights of tower provides an advantage when the vessel is otherwise positioned, for instance, into the wind, as shown in FIG. 3. In this aspect of the present invention, varying the heights of turbines 46 may allow for use of one anchor 48 positioned windward at either bow 42 or stern 44, shown in FIG. 3 at bow 42, without interfering with one another in capturing wind.

In yet another aspect of the present invention, an anchor or anchors may not used, but rather, the vessel hovers in place by use of at least one thruster 49 placed at bow 42 (as shown in FIG. 3) or stern 44, or at both and used in tandem, and may quickly change position as needed. Thrusters 49 allow for maneuvering of the vessel, particularly sideways maneuvering. This is particularly advantageous as it allows ease of adjustment of the position of the vessel at any given time to best capture the wind. Without use an anchor, the vessel may hover and be constantly changing positions as desired by use of at least one thruster. Additionally, use of a global positioning system (GPS) to detect wind direction would allow vessel to employ the thrusters and move accordingly when wind direction changes. In addition to capturing more wind, it is an advantage that the vessel may easily and quickly get away from bad weather as no anchor is employed. A further advantage is that it removes any load on the bottom of the sea and negatively impacting the environment that anchoring typically may cause.

According to the present invention, vessel 10 is positioned so that wind machines, such as turbines 12 as shown in FIG. 1, capture wind. In one aspect of the present invention, the mechanical energy produced by the turbine may then be used or stored as a power source in the vessel. The mechanical energy may be stored, for example, by high-speed gyroscopic flywheel storage. The mechanical energy may be used directly as power source on the vessel, for instance, to drive high pressure pump to make fresh water by osmosis. The mechanical energy may be used to provide propulsion to the vessel, for instance to drive or power the bow thrusters 49 or the motor 29.

In another aspect of the present invention, in addition, or alternative to being used directly, the mechanical energy produced from the turbines is converted to another form of energy. The turbines 12 drive generator 16 to produce electricity. Electricity produced may be used directly and/or stored in electrical storage 28 as a power source for the vessel. For instance, the electrical energy may be used to provide propulsion to the vessel, for instance to drive or power the bow thrusters 49 or the motor 29.

Figure 4:
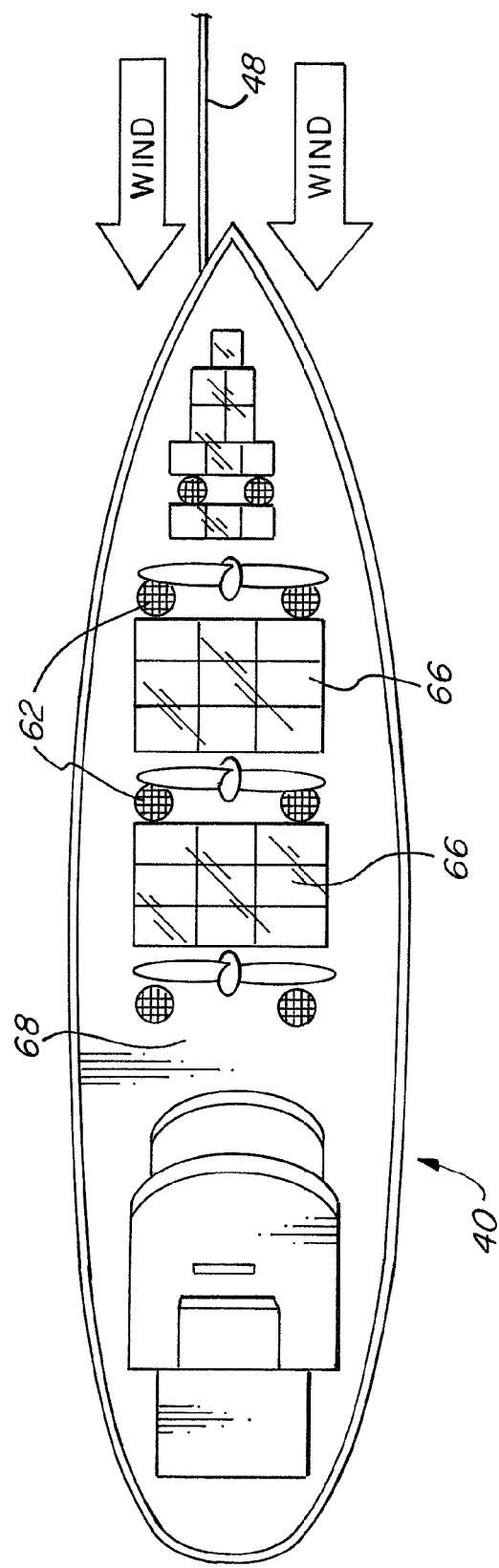
FIG. 4 is a top view of the vessel shown in FIG. 3.

In another aspect of the present invention, the electrical energy generated is converted to another energy form, namely hydrogen. An electrolyzer or electrolytic cell 18 uses the electricity generated by wind energy to convert water into oxygen and hydrogen using a proton-exchange membrane. (Water $H_2O$ is dissociated into the diatomic molecules of hydrogen $H_2$ and oxygen $O_2$.) A fresh water source is required for the electrolytic cell 18 to generate hydrogen. The term "fresh water" as used herein means water of any level of salinity which is suitable for use by the electrolytic cell. As shown in FIG. 4, fresh water is preferably obtained from rainwater which is collected by a water collection system provided on the vessel 40, which may include storm drains 62 on the deck 68 of the vessel 40 to collect rain water and direct it into storage 20 water within the hull 64 of the vessel 40. In another aspect of the present invention, fresh water may be delivered to water storage 20 by a secondary vessel 50, shown in FIG. 2. In yet another aspect of the present invention, a desalination system 22 installed on the vessel 10 may convert surrounding ocean water to fresh water, which then may be used to provide fresh water need for the hydrogen-generating electrolytic process.

In one aspect of the present invention, the hydrogen generated is contained in hydrogen storage 24 on the vessel 10. The storage and subsequent conversion of hydrogen to electrical energy allows for energy generated from the wind to be available for use as needed. From stored hydrogen, electrical power is created by use of a hydrogen fuel cell. The term fuel cell as used herein refers to a device that performs the reverse process of an electrolyzer. The fuel cell combines stored hydrogen with oxygen to produce electricity and water, ultimately converting the stored hydrogen into usable energy. The only by-product is water, and no pollution results. Alternatively, dual function fuel cells which also function in reverse as an electrolyzer may be employed in the present invention. These dual function fuel cells known as a reversible or unitized regenerative fuel cell are able to not only convert stored hydrogen into usable energy by combining it with oxygen, but also to turn electricity into stored hydrogen and oxygen.

In one aspect of the present invention, fuel cell 26 may be integrated into the vessel 10 so that the wind power-generated hydrogen in storage 24 on the vessel may be later utilized to provide an energy source on the vessel. Energy may be consumed upon the vessel, for instance, as the auxiliary power on the vessel 10 or for propulsion of the vessel 10 itself. Vessel 10 may include electrical storage 28 to maintain a supply of electricity (produced by fuel cell) available for use on demand.

In another aspect of the present invention, vessel 10 may serve additionally to transport stored hydrogen 24 to land for delivery to facilities which are in need of a hydrogen fuel source. For instance, gas stations that provide hydrogen fuel to fuel cell cars. Vessel 10 may transport stored hydrogen to existing hydrogen storage facilities on land. These facilities would be able to sore hydrogen as an energy course and additionally by use of a fuel cell may convert the stored hydrogen to generate power.

In another aspect of the present invention, the vessel-mounted wind power system may be used to create electricity directly into a grid of existing electrical power lines. In yet another aspect of the present invention, the vessel-mounted wind system may be used to create electricity for an electrolytic cell located off the vessel to convert to hydrogen and water.

Additionally, as shown in FIG. 4, solar panels 66 may be placed upon vessel 40 to capture sun and serve as a secondary means of generating renewable energy which may be stored, transported or used on the vessel as a power source.

The present invention eliminates the need for additional systems to transport hydrogen fuel. Stored hydrogen 24 may be easily transported by the vessel itself, without the need for building pipelines to transport hydrogen (gas) to the land, or the need for cooling hydrogen to liquefy it and then contain it for transfer to barges or other vessels which would transport it to harbor.

Figure 2:
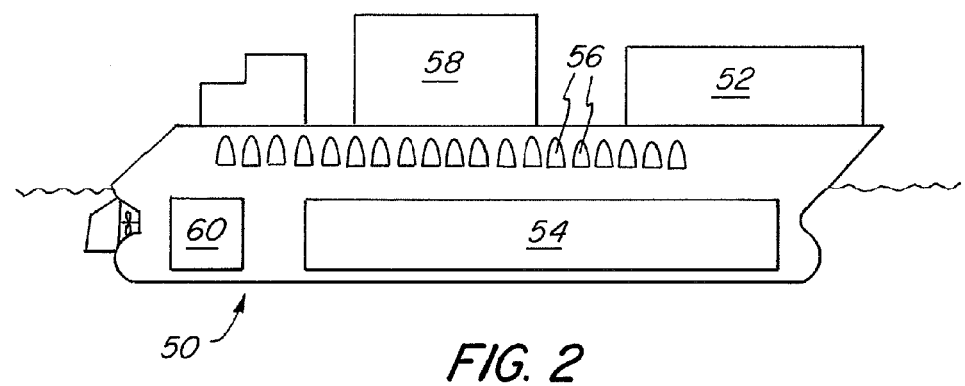
FIG. 2 schematic view of another aspect of the system for generating hydrogen power of the present invention.

In another aspect of the present invention, the system for generating hydrogen power may further include secondary structures, such as ships, as shown in FIG. 2. Secondary ships 50 may carry supplies 52 needed by the primary vessel for its operation and use by passengers thereon and/or fresh water 54 to the primary vessel. Additionally, secondary ships 50 may be equipped for hydrogen storage 56 and have fuel cells 58 to use stored hydrogen 56 as an auxiliary power source. Stored hydrogen generated by the primary vessel may be transferred to the hydrogen storage 56 of the secondary ship 50 for its immediate use, for instance, for auxiliary power or for powering a motor for propulsion of vessel, and may include an electrical storage 50 for the electricity generated by fuel cell 58. Stored hydrogen generated by the primary vessel may be transferred to the hydrogen storage 56 of the secondary ship 50 for its storage and transport elsewhere where a hydrogen fuel is needed as a power source.

Use of fuel cell technology and stored hydrogen creates usable energy from the wind without combustion of fuel and resulting pollution. Hydrogen fuel is an extremely efficient power source. Further, surplus wind energy may be stored (as hydrogen) to be used whenever needed, without having to rely upon the intermittent nature of the wind to generate energy.

The use of wind energy to generate hydrogen fuel is highly advantageous. Placement of a wind power system on vessels has a low cost base, especially in the offshore application where vessels such as cargo ships or oil tankers are surplus. These vessels may no longer be able to perform the role for which they were originally designed and built, yet difficult to remove from water and dispose of them. Adapting them to provide the vessels according to the present invention is an efficient use of surplus and retired ships. Additionally, adapting vessel according to the present invention to capture wind energy is simpler, more efficient and environmentally-sound than the construction of undersea support bases of offshore wind farms. There is no construction or installation of pipelines or cables and no resulting ecological impact on the sea bed or coral reef. These vessels may be removed from sight of shore residents and tourists. Further, in their operation, these vessels have the advantage of being capable of being moved about the sea to capture stronger or more reliable winds, or to escape extreme weather or storms. Further, a vessel according to the present invention has the advantage over traditional windfarms of being a portable energy station, as they may be navigated where needed at a desired location of use, for instance, at a research station or a naval base, and anchored to provide an energy source at that location.

A vessel according to the present invention that converts a renewable energy source, such as wind, to hydrogen fuel for storage, use and/or transport provides many advantages. Stored hydrogen may be used for operation of the vessel itself or by secondary structures, such as ships equipped with fuel cells which may interact with the main vessel or an ocean research station that sends out smaller ships to monitor conditions and factors in its research activity. A vessel according to the present invention may be part of ocean research activity and serve as a platform for ocean and atmosphere science studies, fueling the activities thereon. A vessel with a wind power system may serve as a living platform for scientists and others stationed on vessels for various purposes.

Vessels equipped with wind power systems may also serve as an educational and eco-tourist sites. Education about ocean and atmosphere, recreational scuba dive training, reef snorkeling, small boat activity, fishing, and aquaculture activities could be conducted from the vessel in an environmentally and ecologically-friendly manner using the renewable energy source of the wind.

In other aspects of the present invention, the power source may be other natural, renewable sources, such as solar, geothermal and wave generated energy sources. For instance, the hull of the vessel may be converted to a roller wave containment in order to capture wave action energy to drive air turbines.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A structure for capturing and converting wind power, comprising:
    a vessel retired from its original use, where the vessel is no longer needed for its purpose as originally built, where the original use of the vessel is selected from the group consisting of cargo ship and oil tanker, and where the vessel is still usable and is not damaged or partially sunk;
    a motor to propel the vessel to at least one location for capturing wind power;
    at least one wind machine mounted on the vessel for receiving wind and converting it to mechanical energy;
    a generator to convert the mechanical energy to electrical energy;
    a water source; and
    an electrolytic cell disposed on the vessel for converting the electric energy to chemical energy in the form of hydrogen by electrolyzing water from the water source to produce hydrogen and oxygen.

2. The structure of claim 1, wherein the mechanical energy is converted to electrical energy and stored as a power source on the vessel.

3. The structure of claim 2, further comprising thrusters powered by the mechanical energy to position the vessel to capture the wind.

4. The structure of claim 1, wherein the electrical energy is stored on the vessel.

5. The structure of claim 1, wherein the electrical energy is stored as a power source on the vessel.

6. The structure of claim 1, wherein the motor is powered by the electrical energy to propel the vessel.

7. The structure of claim 3, further comprising bow thrusters powered by the electrical energy to position the vessel to capture the wind.

8. The structure of claim 1, further comprising a hydrogen storage device, the hydrogen fuel stored in the hydrogen storage device.

9. The structure of claim 8, further comprising a fuel cell, fuel cell converting the hydrogen fuel to produce electrical power and water, the electrical power being used by the vessel.

10. The structure of claim 9, wherein the electrical power is used by the motor to propel the vessel.

11. The structure of claim 9, further comprising thrusters powered by the electrical energy to position the vessel to capture the wind.

12. The structure of claim 11, wherein the vessel is navigated to desired locations to transport the stored hydrogen to the desired locations.

13. The structure of claim 8, further comprising a water collection system to collect rainwater to serve as the water source for the electrolytic cell.

14. The structure of claim 13, wherein the water collection system includes storm drains disposed on the deck of the vessel to collect rain water.

15. The structure of claim 8, wherein the water source is supplied to the vessel by a secondary supply ship.

16. The structure of claim 8, further comprising a desalination system to desalinate surrounding seawater, the desalinated water used by the electrolytic cell to form hydrogen.

17. The structure of claim 1, further comprising solar panels disposed on the deck of the vessel to capture sun and convert it to a storable power on the vessel.

18. The structure of claim 1, further comprising a high-speed gyroscopic flywheel storage to store the mechanical energy.

* * * * *